(12) United States Patent
Mozano et al.

(10) Patent No.: US 12,182,237 B2
(45) Date of Patent: Dec. 31, 2024

(54) LEARNING COGNITIVE ACCESS CONTROL SERVICE

(71) Applicant: ServiceNow, Inc., Santa Clara, CA (US)

(72) Inventors: Ashton Mozano, San Diego, CA (US); Mohamed Sofiane Talmat, Utrecht (NL)

(73) Assignee: ServiceNow, Inc., Santa Clara, CA (US)

( * ) Notice: Subject to any disclaimer, the term of this patent is extended or adjusted under 35 U.S.C. 154(b) by 479 days.

(21) Appl. No.: 17/540,031

(22) Filed: Dec. 1, 2021

(65) Prior Publication Data

US 2023/0169156 A1    Jun. 1, 2023

(51) Int. Cl.
*G06F 21/31*      (2013.01)
*G06F 21/60*      (2013.01)
*G06F 21/62*      (2013.01)

(52) U.S. Cl.
CPC .......... *G06F 21/316* (2013.01); *G06F 21/604* (2013.01); *G06F 21/6218* (2013.01); *G06F 2221/2141* (2013.01)

(58) Field of Classification Search
CPC ................ G06F 21/316; G06F 21/604; G06F 21/6218; G06F 2221/2141
See application file for complete search history.

(56) References Cited

U.S. PATENT DOCUMENTS

| 11,902,804 | B2 * | 2/2024 | Viswambharan | H04W 12/06 |
| 2017/0295197 | A1 * | 10/2017 | Parimi | H04L 63/10 |
| 2018/0122219 | A1 * | 5/2018 | Caterino | H04L 9/3226 |
| 2020/0076812 | A1 * | 3/2020 | Spurlock | G06N 20/00 |

OTHER PUBLICATIONS

Luciano Argento, "Towards Adaptive Access Control", 2018, IFIP International Federation for Information Processing, ttps://doi.org/10.1007/978-3-319-95729-6_7,11 pages (Year: 2018).*
Hu et al., "Guide to Attribute Based Access Control (ABAC) Definition and Considerations", NIST National Institute of Standards and Technology. Jan. 2014.
INCITS 499 Revision 1.00, dpANS Next Generation Access Control—Functional Architecture. Aug. 22, 2016.

* cited by examiner

*Primary Examiner* — Han Yang
(74) *Attorney, Agent, or Firm* — Van Pelt, Yi & James LLP (57) ABSTRACT

An indication associated with a request to access a protected object by a subject is received. Using one or more processors, application level behavioral patterns of the subject, context of the request by the subject, usage patterns associated with the protected object, and a current system state are automatically analyzed using one or more machine learning models to determine an analysis result associated with whether to grant the subject access to the protected object. An access control mechanism for the protected object is automatically modified based on the analysis result.

20 Claims, 6 Drawing Sheets

LEARNING COGNITIVE ACCESS CONTROL SERVICE

BACKGROUND OF THE INVENTION

Access control systems allow an organization to secure data and other valuable resources. Typically, access control systems are configured and managed by a system administrator. The system administrator has detailed knowledge of the system, its users, and the level of access that is required and should be allowed for different system resources. For example, an administrator can configure access rules such as access control lists associated with verified user identities to allow or deny access to identified protected resources. These preconfigured rule sets can be applied to an access request to determine whether to grant or deny access for a subject to a protected object.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A learning cognitive access control service is disclosed. Using the disclosed techniques, access control to protected resources is significantly improved by applying a learning cognitive approach to system access control. When an access request for a protected resource is detected, a situationally appropriate resource can be automatically applied based on a learning cognitive model to grant or deny the requested access. The applied response may grant or deny the request by applying different access control approaches such as notifying an administrator of the requested access and then allowing conditional access only after a time window has elapsed for the administrator to intervene. Configurations and reconfigurations of the access controls are applied dynamically and can be automated. The result is an access control service that requires minimal administrative effort and intervention. In various embodiments, the applied access control responses are learned responses based at least in part on monitoring the system. For example, a machine learning approach is applied using identified subject behavioral patterns, identified resource usage patterns, and monitored system state and context data. In some embodiments, the learning cognitive approach continuously monitors the system to identify proper and improper responses that are utilized to continuously improve the applied learning models.

In some embodiments, an indication associated with a request to access a protected object by a subject is received. For example, a user requests write access to a protected database table. The write access request is identified as a request to access a protected object and the user is identified as the subject requesting the access. In some embodiments, at least application level behavioral patterns of the subject, context of the request by the subject, usage patterns associated with the protected object, and a current system state are automatically analyzed using one or more machine learning models to determine an analysis result associated with whether to grant the subject access to the protected object. For example, behavioral patterns of the user are identified along with the context of the user's write request. As one example of a behavioral pattern, a user may commonly access the particular database table that is the protected object from the user's workstation prior to the end of each quarter to update quarterly numbers. The usage pattern associated with the database table is also identified along with the current state of the system. These inputs are automatically analyzed using one or more machine learning models to determine whether or not to grant the user the requested access to the protected database table. In some embodiments, an access control mechanism for the protected object is automatically modified based on the analysis result. For example, based on the analysis performed, access for the protected database table is granted and modifications are made to an access control mechanism to allow the user the requested access. In some embodiments, the modification involves updating existing identity-based and associated access control lists.

Figure 1:
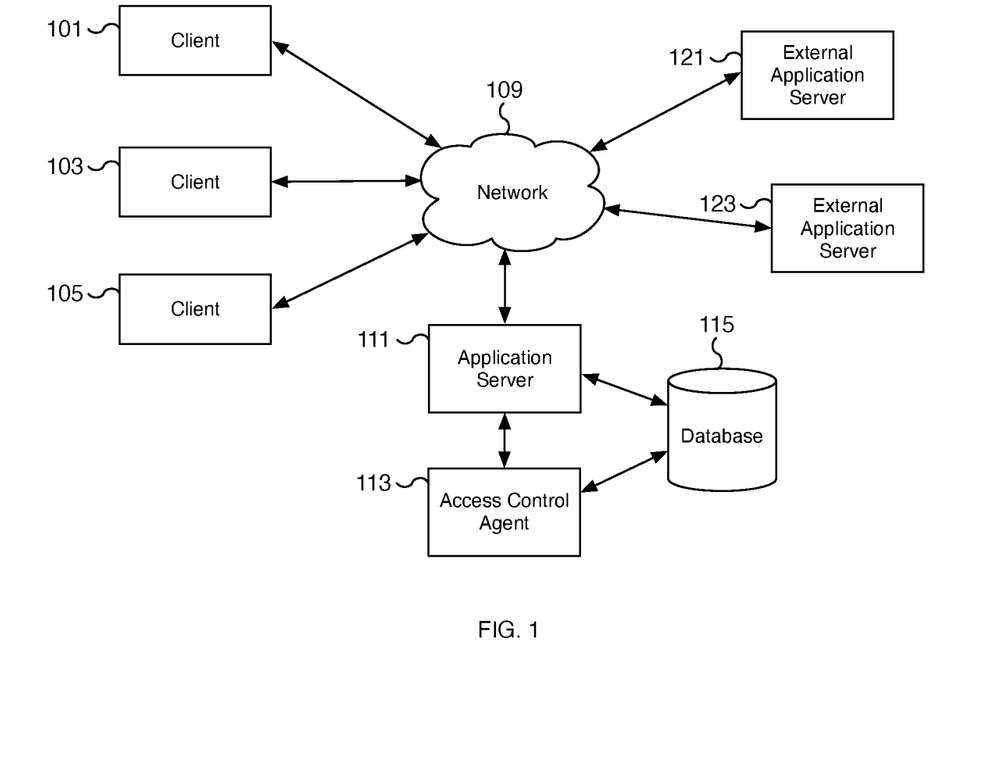
FIG. 1 is a block diagram illustrating an example of a network environment for providing a learning cognitive access control service.

FIG. 1 is a block diagram illustrating an example of a network environment for providing a learning cognitive access control service. In the example shown, clients 101, 103, and 105 access application services such as services provided by application server 111, external application server 121, and external application server 123. As shown in the example, clients 101, 103, and 105, application server 111, external application server 121, and external application server 123 are communicatively connected via network 109. In some embodiments, network 109 is a public network such as the Internet. Access to application server 111 from clients such as clients 101, 103, and/or 105 is supervised by a learning cognitive access control service implemented by access control agent 113. In the example shown, application server 111 and access control agent 113 are communicatively connected to and utilize database 115.

In some embodiments, clients 101, 103, and 105 are network clients and can include network applications such as a web browser for accessing applications services offered by application server 111, external application server 121, and external application server 123. For example, offered network services can include web applications, other cloud-based service applications, and/or access to other resources. Example application services include a configuration management database (CMDB) service, a customer relationship management (CRM) server, an enterprise resource planning (ERP) service, and a content management system service, among others. In various embodiments, the access to the network services and/or resources is controlled, for example, by an access control list. In some embodiments, when a client such as one of clients 101, 103, or 105 accesses an application service and/or resource, the client is associated with a user identity.

In some embodiments, application server 111, external application server 121, and external application server 123 are each a cloud-based application server that offers one or more cloud-based application services. External application servers 121 and 123 are included in the network example to demonstrate that access to application server 111 is controlled via access control agent 113. For example, access from clients 101, 103, and 105 to application server 111 is supervised, monitored, and/or controlled at least in part by access control agent 113. In the example shown, external application server 121 and/or external application server 123 corresponds to external application services that are not under the control of access control agent 113. For example, clients 101, 103, and 105 can access application services and/or resources associated with external application server 121 and/or external application server 123 without the supervision of access control agent 113.

In some embodiments, access control agent 113 is a network agent that implements a learning cognitive access control service for providing access control to application server 111. For example, when clients such as clients 101, 103, and 105 access application server 111, access control agent 113 can allow or deny the access based on the context of the access request including based on the subject requesting access and the resource from which the access is requested for. In various embodiments, access control agent 113 is utilized at least in part to monitor access from clients and/or access to resources associated with application server 111. For example, access control agent 113 can be used to identify behavioral patterns including the corresponding context of the patterns associated with clients and/or resources. In some embodiments, the monitoring and identification of behavioral patterns is performed by a component separate from the access control component of access control agent 113. For example, one or more additional agents and/or processes (not shown) separate from access control agent 113 can monitor and identify behavioral patterns associated with application server 111. In some embodiments, the additional agents such as monitoring agents are installed at the client and/or at the application server, for example, on application server 111.

In some embodiments, application server 111 and access control agent 113 utilize a database or similar data store such as database 115 for performing their respective services. Although shown as a single database, database 115 can be implemented as multiple databases and the associated data may be distributed across multiple different data stores. Although database 115 is shown directly connected to application server 111 and access control agent 113, in some embodiments, database 115 is a network database that is communicatively connected and not necessarily directly connected to application server 111 and/or access control agent 113.

Although single instances of some components have been shown to simplify the diagram of FIG. 1, additional instances of any of the components shown in FIG. 1 may also exist. For example, application server 111, external application servers 121 and/or 123, and access control agent 113 may include one or more different servers and/or multiple components. Similarly, database 115 may include one or more database servers and may not be directly connected to application server 111 or access control agent 113. For example, database 115 and its components may be replicated and/or distributed across multiple servers and/or components. In some embodiments, external application servers 121 and 123 can each be implemented using one or more different servers and may each rely on one or more different external data sources (not shown). In some embodiments, components not shown in FIG. 1 may also exist.

Figure 2:
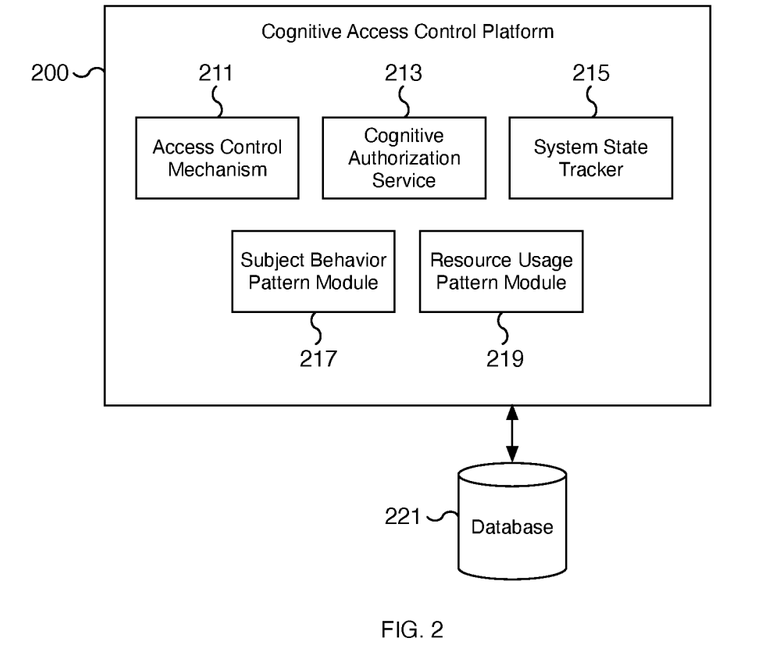
FIG. 2 is a block diagram illustrating an embodiment of a cognitive access control platform.

FIG. 2 is a block diagram illustrating an embodiment of a cognitive access control platform. Cognitive access control platform 200 is utilized for evaluating access controls for subjects accessing resources. In the example shown, cognitive access control platform 200 includes access control mechanism 211, cognitive authorization service 213, system state tracker 215, subject behavior pattern module 217, and resource usage pattern module 219. In various embodiments, cognitive access control platform 200 is utilized to provide a learning cognitive access control service. For example, when clients access a resource, cognitive access control platform 200 it utilized to identify the request and to provide the appropriate modifications to existing access controls, such as granting a user temporary access to a requested resource for a determined time frame as dictated by the situation. Cognitive access control platform 200 is a learning cognitive system that can apply the appropriate access controls for a particular situation based on observed behavior of subjects and resources of the system. In some embodiments, the configuration, including learned patterns and associated identified contexts, for cognitive access control platform 200 is stored in a database such as database 221. In various embodiments, the applied access controls can utilize existing access control mechanisms that lack cognitive and/or learning features. In some embodiments, cognitive access control platform 200 is implemented at least in part by access control agent 113 of FIG. 1 for providing a learning cognitive access control service for resources associated with application server 111 of FIG. 1. In some embodiments, cognitive access control platform 200 is utilized to grant or deny access to resources of application server 111 of FIG. 1 from clients 101, 103, and 105 of FIG. 1. In some embodiments, database 221 is database 115 of FIG. 1.

In the example shown, cognitive access control platform 200 includes access control mechanism 211. Access control mechanism 211 can be a rule-based and/or list-based access control mechanism. In some embodiments, access control mechanism 211 utilizes an existing access control system such as an existing cloud-based solution and lacks cognitive and/or learning functionality. Example solutions can utilize Identity Based Access Control (IBAC) and Access Control Lists (ACLs), Role Based Access Control (RBAC), Attribute Based Access Control (ABAC), and/or Next Generation Access Control (NGAC) techniques. In various embodiments, access decisions determined by cognitive authorization service 213 utilize access control mechanism 211 to enable or deny access to a controlled resource. For example, cognitive authorization service 213 can provide a determination to modify an access control list under the control of access control mechanism 211 in order to grant access for a particular user in a particular situation to a particular resource.

In some embodiments, cognitive authorization service 213 is a learning cognitive system that evaluates whether access should be granted or denied when a subject requests access to a resource. Further, in various embodiments, cognitive authorization service 213 can determine the context such as the length of time and under what controls the access should be granted and/or denied. The access control determinations can be based on the context of the access request and on identified behavioral patterns such as monitored behavioral patterns of the subject and/or usage patterns of the resource. Using cognitive authorization service 213, access control is dynamically configured and/or reconfigured as appropriate by interfacing with access control mechanism 211. Moreover, modifications to access control by cognitive authorization service 213 using access control mechanism 211 can be automated and require minimal manual tuning from an administrator. For example, access control can be automated and based on prior learned behaviors identified by monitoring the behavioral patterns of subjects, the usage patterns of resources, and the corresponding contexts of their behavioral and usage patterns, among other system activity. Complex access control scenarios can be implemented by cognitive authorization service 213. For example, once a request to access a resource is identified, cognitive authorization service 213 can determine whether and how to grant the subject access to the resource. In some embodiments, a notification is sent to the appropriate administrator notifying the administrator that access will be granted after a threshold amount of time, such as after five minutes. In the event the administrator does not respond within five minutes, the subject is automatically granted access to the resource for a second threshold amount of time. After the second threshold amount of time has elapsed, the subject's access to the resource is denied until the administrator determines that permanent access should be granted. This approach can be appropriate based on context. For example, the subject may be requesting access to a database table resource that one of the subject's subordinates ordinarily has access to and who also requires approval from the subject to make any permanent database writes. When the subordinate is unavailable and the subject requests access to the database table, cognitive authorization service 213 can identify from the system context that the subordinate is unavailable for a window of time and grant the subject access to perform database table writes until the subordinate returns. This access pattern is but one example of an automated and context-based approach to access control that utilizes the learned behavior and usage patterns identified from monitoring the system.

In some embodiments, cognitive authorization service 213 relies on one or more components to determine an appropriate access control decision. For example, the various input parameters for determining whether a request for a resource should be granted are based on input from system state tracker 215, subject behavior pattern module 217, and/or resource usage pattern module 219. In various embodiments, a cognitive access control platform such as cognitive access control platform 200 can include and utilize input from one or more of these components. In some embodiments, system state tracker 215 tracks the current state of the monitored system including system resources, system activity, system changes, resource usage, access to resources, etc. For example, system state tracker 215 can monitor what resources are being utilized, what resources have been granted access to and by whom, what actions are being performed by clients, and the state of the various system clients and resources, among other state parameters. In various embodiments, system state tracker 215 determines a context associated with any resource usage and/or subject behavior. The identified context is based on the current state of the system and can be associated with any identified behavior and usage patterns. In some embodiments, system state tracker 215 is composed of multiple components (not shown) that can be distributed to monitor the system from different perspectives.

In some embodiments, subject behavior pattern module 217 identifies subject behavior patterns. For example, subject behavior pattern module 217 can utilize input from system state tracker 215 to determine the usage patterns and/or behaviors of a user or client and/or of groups of users or clients. In various embodiments, usage behavior is used to predict whether a client is justified in accessing a particular resource based on past behavior. Similarly, resource usage pattern module 219 identifies resource usage patterns. For example, resource usage pattern module 219 can identify when, by whom, and to what extent resources are used and whether the current request fits within an existing pattern of usage. As one example, a particular database table can be frequently queried in a read-only state. A sudden flood of database write actions to the same database table does not fit the existing usage pattern. In various embodiments, resource usage pattern module 219 can identify the requested writes as atypical and not matching an existing identified usage pattern.

Figure 3:
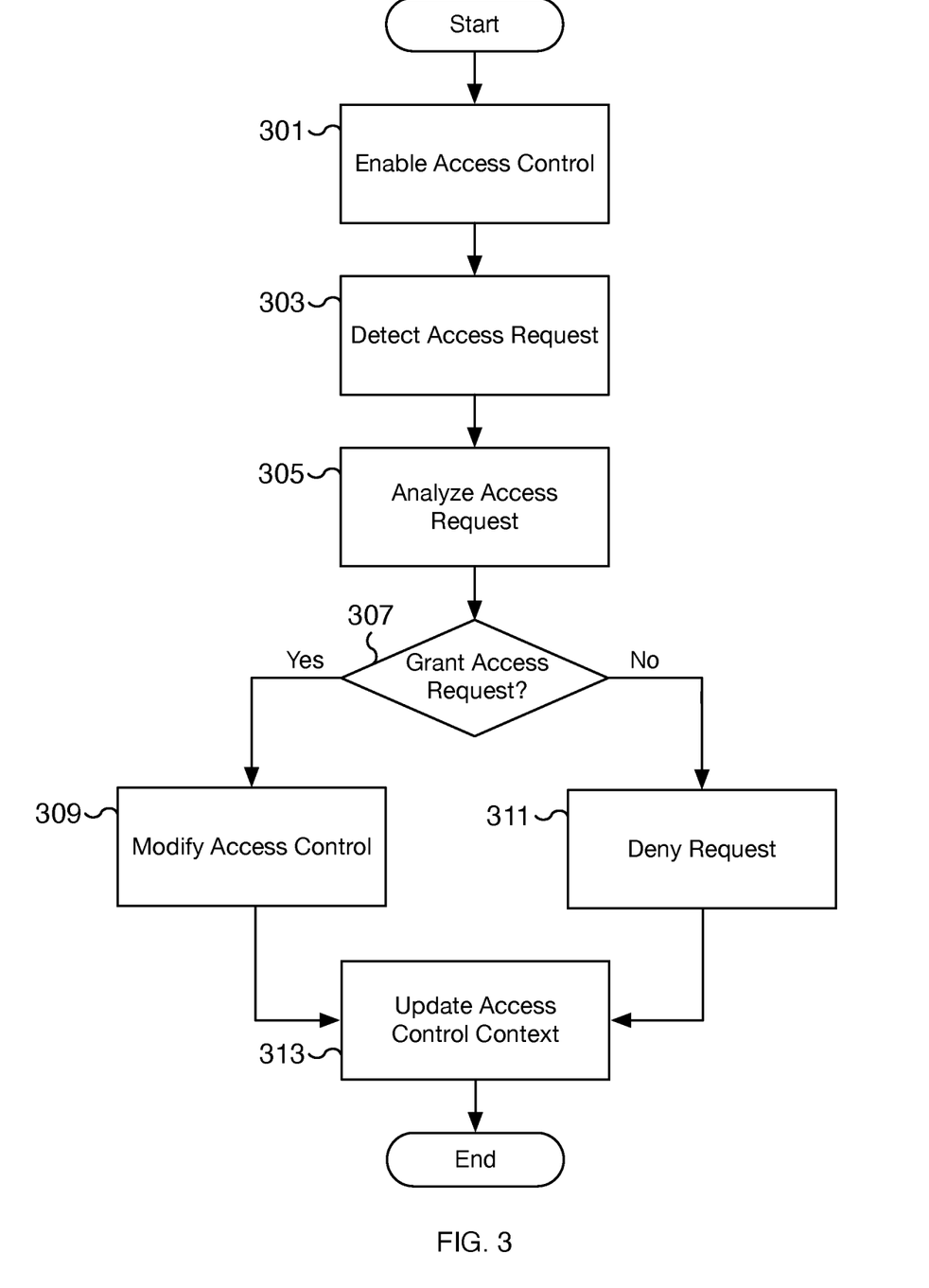
FIG. 3 is a flow chart illustrating an embodiment of a process for providing a learning cognitive access control service.

FIG. 3 is a flow chart illustrating an embodiment of a process for providing a learning cognitive access control service. Using the process of FIG. 3, a cognitive access control platform can provide an access control service to a system based on learned identified behavioral patterns such as monitored behavioral patterns of the subject and/or usage patterns of the resource. The provided learning cognitive access control service can dynamically configure and/or reconfigure access control for a system as appropriate based on system context. In some embodiments, the process of FIG. 3 is implemented at least in part by access control agent 113 of FIG. 1 for providing a learning cognitive access control service for resources associated with application server 111 of FIG. 1. In some embodiments, the process of FIG. 3 is performed using cognitive access control platform 200 of FIG. 2.

At 301, access control is enabled. For example, a learning cognitive access control service is enabled to monitor and respond to access control related requests for a system. In some embodiments, the enabling of access control includes enabling monitoring of the target system such as enabling monitoring of system state, actions performed by clients, and usage and utilization of system resources. In various embodiments, the access control enabled can utilize a cognitive access control authorization service such as cognitive authorization service 213 of FIG. 2 to interface with an existing cloud-based access control solution that lacks cognitive and/or learning functionality.

At 303, an access request is detected. For example, an access request for a protected resource such as a database table, file system, or another resource, by a client, is detected. In some embodiments, the client is a network client accessing a protected resource associated with an application server or service. In various embodiments, the access is detected by one or more monitoring services that actively track actions associated with resources of the target system. In some embodiments, the access request is a physical access such as access to a data center. In various embodiments, different types of access including hardware, software, physical, and/or various combinations of hardware, software, and physical access can be detected. In some embodiments, the detection includes identifying the source(s) of the request, the time and location of the request, the requested resource, the type of access request, and other context associated with the access request.

At 305, the access request is analyzed. For example, the access request detected at 303 is analyzed to determine an appropriate response such as granting or denying the access request. In some embodiments, the analysis is performed by applying one or more machine learning models to determine an analysis result associated with whether to grant the access request to the protected resource. The machine learning models can utilize as input application level behavioral patterns of the subject, usage patterns associated with the protected resource, the context of the request by the subject, and the current state of the system. In various embodiments, the determination to grant or deny the access request is not strictly a binary allow or disallow determination and multiple situationally appropriate responses can be determined as appropriate. For example, one approach allows for temporary access to be granted for a resource only after a time window is provided for an administrator to deny the access. Another approach allows for a user to be granted access only when the primary user of a resource is identified as unavailable. For example, the primary user with access to the requested resource can be identified as on leave or on vacation. During the primary user's absence, another subject can be automatically granted permission to the requested access based on an established relationship between the subject to the primary user. In various embodiments, the access request is analyzed based on identifying behavioral patterns of subjects, usage patterns of resources, and the associated context of the requested access and intended actions based on the requested access. In various embodiments, the analysis of the request is based on a learning model that uses past data gathered by monitoring the state of the system.

At 307, a determination is made whether the access request is granted. In the event the access request is granted, processing proceeds to 309. In the event the access request is denied, processing proceeds to 311.

At 309, access control for the system is modified. For example, the access control for the system is modified to allow an appropriate form of access to the requested resource. In some embodiments, the access granted is only temporary and/or conditional access and the access can be revoked based on certain triggers such as actions performed, time windows, or other parameters. In various embodiments, the determination of the appropriate access control modifications are based on learning cognitive decisions but the learning cognitive access control service can utilize an existing access control framework, such as one based on Identity Based Access Control (IBAC) and Access Control Lists (ACLs), for the actual granting and denying of access to particular users for particular resources.

At 311, the access request is denied. For example, based on the analysis performed at 305 and the determination made at 307 that the access request is not appropriate, at 311 the access request is denied and an access denial response is performed. In some embodiments, the denied request is logged, an administrator can be notified, and appropriate access control modifications are made. For example, a risk level can be determined for the denied access request and based on the determined risk level, the appropriate notification can be provided to an administrator. As an example, a single failed login attempt from a network location commonly used by a user does not trigger a high-level alert in the event a successful login attempt is made within a threshold time period. In contrast, multiple repeated failed login attempts from a network location not associated with the user that occur during work hours while the user is logged into the network from a known location will trigger a high level alert and can initiate additional denial response actions in addition to denying the access request. For example, the ability to log in remotely for the user may be disabled for a certain time period, additional measures of authentication can be required, and access to certain resources typically accessible by the user may be limited, among other denial response actions.

At 313, the access control context is updated. For example, the context associated with the access request and the determination to allow or deny the request is identified and updated. In various embodiments, the tracked access control context is used to inform the learning cognitive access control service on how to respond to future access control situations. In various embodiments, the context is used to identify behavioral and usage patterns and the appropriate context-appropriate responses. In some embodiments, the tracked context is used to train a machine learning model used for performing at least a portion of the access request analysis performed at 305.

Figure 4:
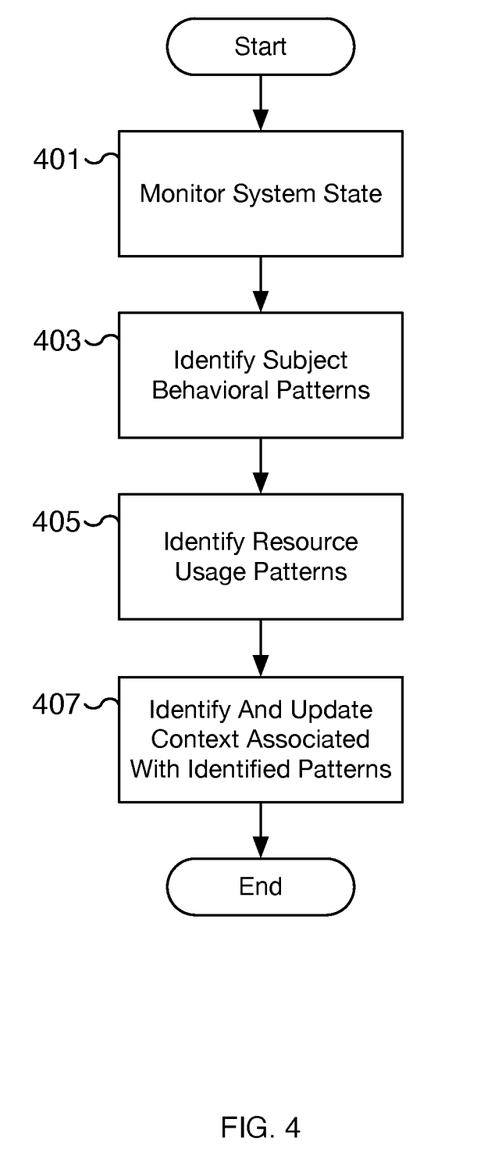
FIG. 4 is a flow chart illustrating an embodiment of a process for enabling a learning cognitive access control service.

FIG. 4 is a flow chart illustrating an embodiment of a process for enabling a learning cognitive access control service. Using the process of FIG. 4, a learning cognitive access control service can be enabled to respond to future access control situations. The various components of a cognitive access control platform are activated to allow subsequent access to the various resources of a target system to be controlled by a learning cognitive access control service. For example, access to the resources of the target system are controlled via a learning cognitive model that provides situational appropriate responses based on the context of an access request, and the process of FIG. 4 is used to initialize the learning cognitive access control service. In some embodiments, the process of FIG. 4 is continuously performed to enable the learning cognitive access control service used to control access to application server 111 of FIG. 1. In some embodiments, the learning cognitive access control service is implemented at least in part by access control agent 113 of FIG. 1 and/or by a cognitive access control platform such as cognitive access control platform 200 of FIG. 2. In some embodiments, the process of FIG. 4 is performed at 301 of FIG. 3.

At 401, the state of the system is monitored. For example, the state of a target system is monitored. In various embodiments, the properties of the system that are monitored include resources, access to resources, the timing and length of the access, how the resources are accessed, by whom the resources are accessed, etc. For example, a system state tracker such as system state tracker 215 of FIG. 2 is used to monitor what resources are being utilized, what resources have been granted access to and by whom, what actions are being performed by clients, and the state of the various system clients and resources, among other state parameters. In some embodiments, the monitoring is performed by multiple monitoring agents and the agents can be distributed.

At 403, subject behavioral patterns are identified. For example, using the monitored data collected at 401, subject behavioral patterns are identified and utilized for future access control decisions. In some embodiments, the behavioral patterns are identified based on the subject performing the behavioral pattern and/or based on a group that the subject belongs to. For example, network login patterns, database usage patterns, file system patterns, application service usage patterns, among other behavioral patterns including other application level behavioral patterns can be identified. In some embodiments, the identified patterns are associated with the action taken, the user or group of users taking the actions, the time the action is performed, the length of time the action takes, the location from which the action is performed, the resource on which the action is performed, and other actions being performed on the target resource, among other pattern properties. In some embodiments, the subject behavioral patterns are identified and monitored by subject behavior pattern module 217 of FIG. 2.

At 405, resource usage patterns are identified. For example, using the monitored data collected at 401, resource usage patterns are identified and utilized for future access control decisions. In some embodiments, the resource usage patterns are identified based on the interaction and/or lack of interaction with resources of the target system. For example, write access to a particular portion of a file system can be monitored and usage patterns identified. Similarly, access to database tables can be monitored and usage patterns identified. In various embodiments, monitored access to resources can include physical resources such as access to a conference room, data center, or warehouse. In some embodiments, the identified resource usage patterns include identifying when, by whom, and to what extent a resource is used and whether the identified usage fits within an existing pattern of usage. In some embodiments, the resource usage patterns are identified and monitored by resource usage pattern module 219 of FIG. 2.

At 407, the context associated with identified patterns is identified and updated. For example, each identified usage pattern, whether a subject behavior pattern or a resource usage pattern, is associated with a particular system context. The system context can describe the underlying scenario related to the occurrence of a pattern. For example, a system context can include the time of day, location, current resource usage and allocation, and client status, among other properties that are associated with an identified pattern. In various embodiments, establishing a context to associate with a subject action and/or resource usage allows the learning cognitive access control service to differentiate between situations where the same action is performed on the same resource. By establishing a context for the various identified patterns, the learning cognitive access control service can determine a situationally appropriate response to an access control scenario. In some embodiments, the context of a system is identified by system state track 215 of FIG. 2 along with patterns identified by subject behavior pattern module 217 and/or resource usage pattern module 219 of FIG. 2. In various embodiments, the associated contexts of identified patterns are utilized by cognitive authorization service 213 to determine situationally appropriate responses to an access control scenario. By constantly updating the context and identified patterns, the learning cognitive access control service can continuously adapt to changes in the underlying system.

Figure 5:
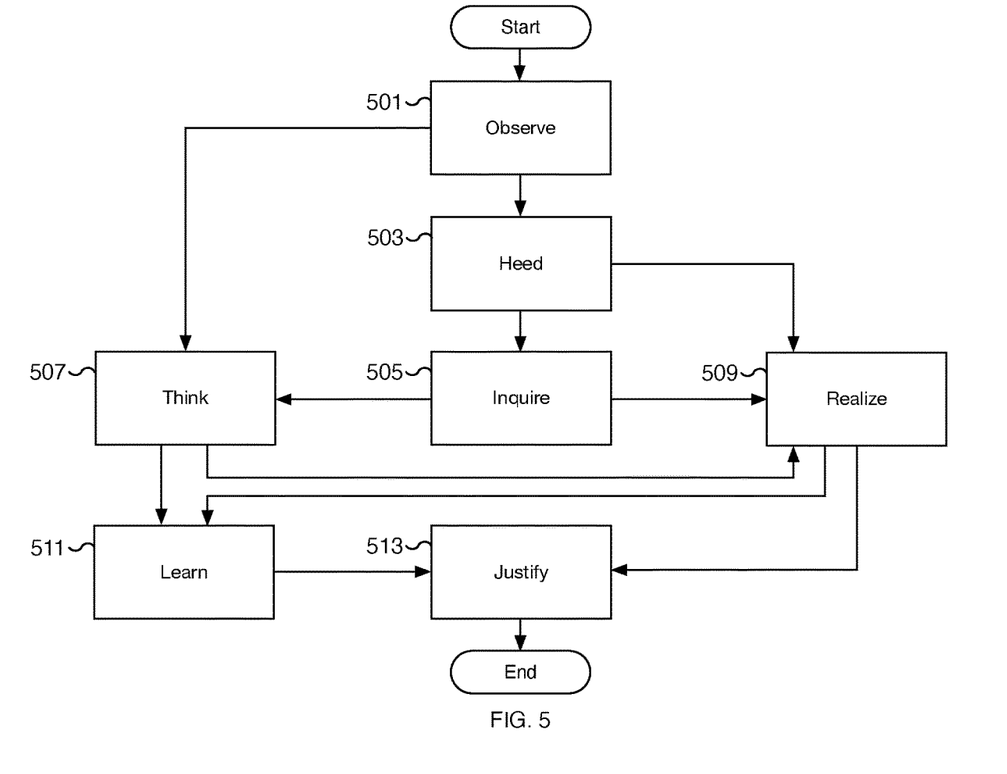
FIG. 5 is a flow chart illustrating an embodiment of a process for responding to an access control request.

FIG. 5 is a flow chart illustrating an embodiment of a process for responding to an access control request. Using the process of FIG. 5, a learning cognitive access control service can utilize a learning model to respond to access control situations. For example, access requests to the resources by subjects of the target system can be monitored and configuration and reconfiguration of access control to a target system can be made dynamically and be automated. In some embodiments, the process of FIG. 5 is a learning cognitive process that improves over time as additional usage patterns are identified and recognized by the learning model. In some embodiments, the process of FIG. 5 is performed at 303, 305, 307, and/or 313 of FIG. 3. In some embodiments, the process of FIG. 5 is performed at least in part by access control agent 113 of FIG. 1 and/or by a cognitive access control platform such as cognitive access control platform 200 of FIG. 2 to control access to application server 111 of FIG. 1. In some embodiments, the process of FIG. 5 is performed by cognitive authorization service 213 of FIG. 2 using input from other components of cognitive access control platform 200 of FIG. 2. In some embodiments, the output of the process of FIG. 5 is used to implement access control decisions such as granting and denying access for a particular subject to a particular resource using an existing access control mechanism that lacks cognitive and/or learning features.

In the example shown, the flow chart of FIG. 5 depicts the various states of an access control learning framework and how they interact. The various states (observe, heed, inquire, think, realize, learn, and justify) work together to establish the cognitive and/or learning features of the learning cognitive access control service. In various embodiments, the states can receive input from other components such as system state track 215 of FIG. 2, subject behavior pattern module 217, and/or resource usage pattern module 219 of FIG. 2 to make determinations on how to proceed in the learning framework. Similarly, some of the states provide output to direct modifications to the access control of the system, for example, by interfacing with an existing access control mechanism such as access control mechanism 211 of FIG. 2.

At 501, an observe state is performed. For example, the learning cognitive access control service captures system state changes such as software and/or hardware changes. The input can be captured at various different layers of the system such as low-level hardware changes, such as changes to CPU and memory usage, and to physical changes, such as someone entering a building. Various instrumentation can be deployed to capture the information needed in the observe state. In some embodiments, the input data is captured via system state track 215 of FIG. 2. Based on the observations performed at 501, processing can procced to the heed state at 503 or the think state at 507. In some embodiments, in the event insufficient observations are made at 501 to determine whether the observations are relevant to access control, processing continues to the heed state at 503. In the event sufficient observations are made at 501 to determine that the observations are relevant to access control, processing continues to the think state at 507.

At 503, a heed state is performed. In the heed state, usage patterns are identified to determine whether they are relevant to access control. In some embodiments, the usage patterns are identified by monitoring user session details, various logs, and other interactions with the system such as manual queries and support requests. In some embodiments, the determination whether an identified behavior is relevant to access control is performed in real time based on observations made in the observe state at 501. The heed state can be implemented using data mining techniques, support vector machines, and/or other appropriate techniques. In some embodiments, the identified patterns are prioritized and only the most relevant patterns require further processing at the inquire state at 505 and/or the realize state at 509. In some embodiments, in the event additional information is needed, processing continues to the inquire state at 505. In the event no additional information is needed, processing continues to the realize state at 509.

At 505, an inquire state is performed. In the inquire state, inquiries can be made to additional information sources to gather additional input data/knowledge about an access request, subject/user/client, system resource, action/behavior, intention, context, and consequences, or another context variable. For example, external application programming interfaces (APIs) or other communication interfaces can be utilized to query system services, virtual agents, and even the human user for additional information. In various embodiments, the received additional inquired information is utilized in the think state at 507 and the realize state at 509. In the event think processing or additional think processing is required, processing proceeds to the think state at 507. In the event the think state has already been performed, for example, in a previous iteration, no additional think processing is needed, and processing proceeds to the realize state at 509.

At 507, a think state is performed. At the think state, an ensemble learning approach is utilized that combines supervised learning with unsupervised learning models and methods. Using the learning cognitive approach, existing knowledge is leveraged to determine the context of certain subject actions and behavior. For example, a user may be attempting to delete a certain column of data from a database table and a determination is made that the deletion attempt is an unusual action for the user. In the think state at 507, nth order effects of such actions and behavior are determined. For example, a determined 1st-order effect is the removal of data from a database table column that is marked as "sensitive." A determined 2nd-order effect can include that a certain application can no longer display the removed data. A determined 3rd-order effect can include that certain specific users can no longer access the application. A determined 4th-order effect can include that one of the users, who is a security administrator, can no longer prevent the unauthorized download of sensitive data from the system. Finally, a determined 5th-order effect includes that the system will be vulnerable to unauthorized exfiltration. Based on the determined nth order effects, an additional think analysis is performed to determine the optimal decision in light of the intended user actions and consequences. For example, in the above example, the user's attempt to delete the certain column data can be automatically denied and deletion privileges for the user can be temporarily revoked until approved by an administrator, deletion privileges for the user can be temporarily revoked until a denial time window has elapsed, or another situationally appropriate response can be determined. In some embodiments, the think state is performed and implemented using hidden Markov models including machine learning trained models. Once the think state has completed, processing continues to the realize state at 509 or the learn state at 511. In the event a determination is made that requires realization, processing proceeds to the realize state at 509. In the event no determination is made that requires realization, processing proceeds to the learn state at 511.

At 509, a realize state is performed. For example, using the results from various other states such as the observe state at 501, the heed state at 503, the inquire state at 505, and the think state at 507, at the realize state, one or more various realizations are determined. In some embodiments, a graphical representation of the current system context is created and used to determine a realization decision. The graphical representation corresponds to the current state of the system and existing events such as subject actions, intended actions, access requests, and resource usages. In some embodiments, a realization includes a prediction that an intended consequence/result will occur in the event that a prospective action is performed. The prediction can include a corresponding confidence rating associated with the occurrence of the intended result. Based on the evaluated confidence rating, a determination is made whether or not to perform the associated prospective action. In some embodiments, the confidence rating must exceed a threshold value to trigger performing the corresponding prospective action. For example, in the event the confidence rating exceeds the threshold value, the prospective action is realized and performed. The system can then be subsequently monitored, for example, in the learn state at 511, to detect whether the intended consequence/result occurs. In the event the confidence rating does not exceed the threshold value, the prospective action is not realized and the prospective action is not performed.

In various embodiments, once the realize state has completed, processing continues to the learn state at 511 and/or the justify state at 513. In some embodiments, both the learn and justify states can operate in parallel. In some embodiments, the learn state is performed only in the event an action has been realized and learning can be performed based on the observed consequences of the realized action. For example, in the event an action (such as a grant or deny action) is realized, processing proceeds to the learn state at 511. In the event no action is realized, processing can proceed to the justify state at 513. In some embodiments, the realize state interfaces with an external access control mechanism to implement any realized actions.

At 511, a learn state is performed. In the learn state, decisions made during the think state at 507 and realize state at 509 are analyzed along with the consequences and/or results of those decisions. In various embodiments, the learn state allows past actions to be analyzed to improve future actions and responses. The learn state can be implemented using real-time observations from monitoring the system state. Existing models as well as supervised learning techniques can be applied to continuously gather data from the monitoring and as well as to the results of determinations made during processing in the think state at 507 and the realize state at 509. In some embodiments, the learn process is implemented using synthetic data generation and is performed using the latest iterations of Generative Adversarial Networks (GANs). For example, in the event there is insufficient data, GANs techniques can be utilized to simulate different potential outcomes with different behavioral and usage patterns. Additional data provided by domain experts and modeling can be utilized as well. In the learn state at 511, a bad decision that is realized can be identified and used to improve future responses. For example, based on identifying bad decisions, new learning cognitive models are rebuilt that allow for improved responses in the future. Once the learn stage is complete, processing proceeds to the justify state at 513.

At 513, a justify state is performed. In the justify state at 513, a reasoning is determined for allowing or denying access for the relevant scenario. In some embodiments, the output of the reasoning ties the access control actions to a standard policy or practice. For example, the output of the justify state can be used as a tamper-evident audit trail for the granting or denying of access to resources for a subject based on a standard system policy. In some embodiments, the policies are based on industry best-known practices and standards. In some embodiments, the context of the response is tracked along with the provided justification. Once the justify state is complete, the process of FIG. 5 is complete for the associated observations observed at 501. In some embodiments, the processing loops back to the observe state at 501 and the process of FIG. 5 runs continuously to continuously monitor the access control of the system. By continuously monitoring the system, the responses to observed behaviors can be utilized to learn from past responses.

Figure 6:
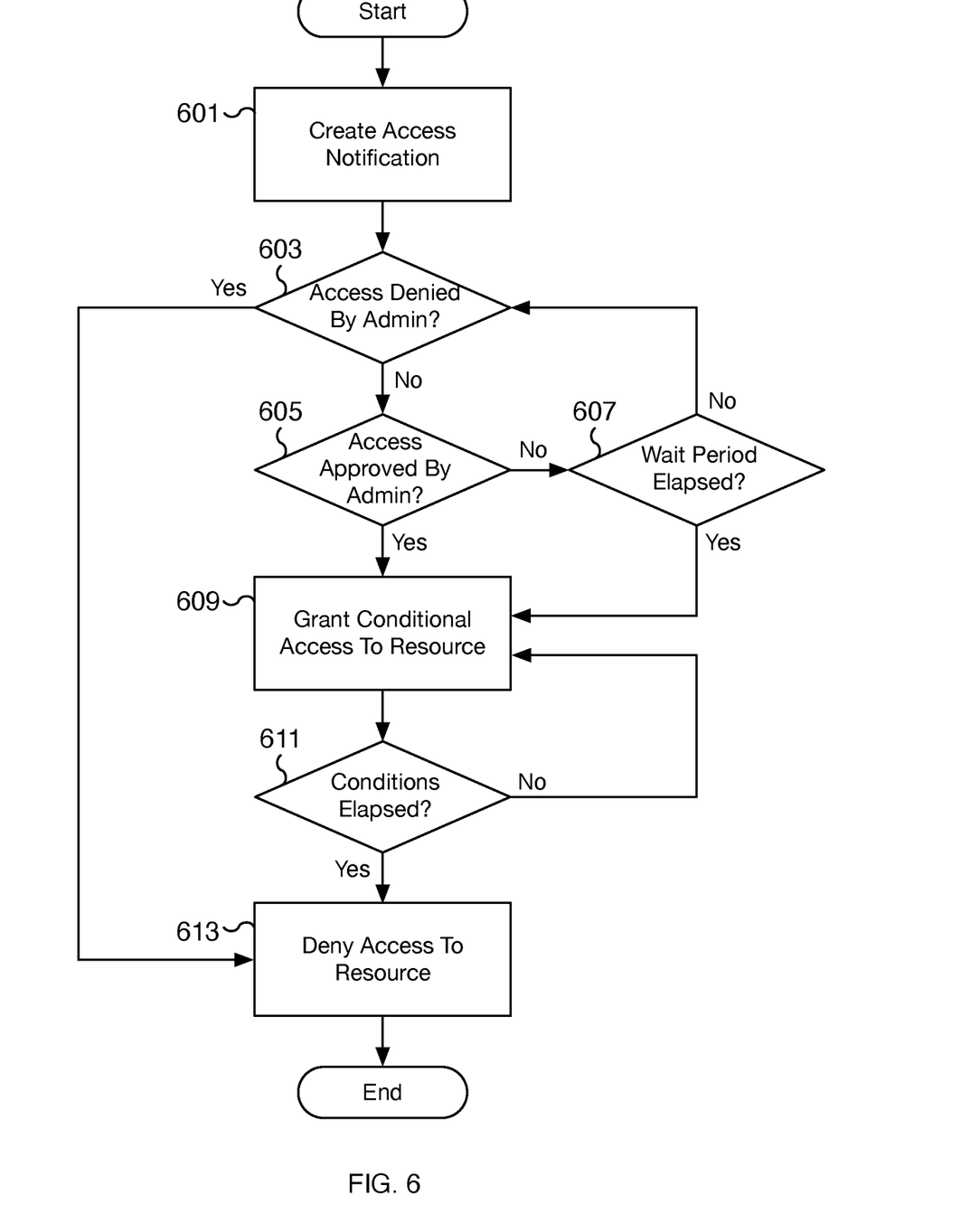
FIG. 6 is a flow chart illustrating an embodiment of a process for implementing an example access request response.

FIG. 6 is a flow chart illustrating an embodiment of a process for implementing an example access request response. Using the process of FIG. 6, a learning cognitive access control service responds to an access control request. The example response is but one response that can be situationally appropriate based on the context of the detected access request. The example response of FIG. 6 is an automated response to an access request that allows a subject conditional access to a protected resource unless otherwise denied by an administrator. Other responses can be appropriate as well. In the example shown, the response reflected by the process of FIG. 6 is determined at 305 of FIG. 3 and/or using the process of FIG. 5. In some embodiments, the process of FIG. 6 is determined at least in part by access control agent 113 of FIG. 1 and/or by a cognitive access control platform such as cognitive access control platform 200 of FIG. 2 to control access to a resource of application server 111 of FIG. 1. In some embodiments, the process of FIG. 6 is performed at 309 and/or 313 of FIG. 3.

At 601, an access notification is created. For example, a notification is created as part of a realization of a response to the detected access control request by a subject to a protected resource. The notification can be sent to a system administrator responsible for the targeted resource being accessed. In various embodiments, the notification can be an email, a text message, a system alert, and/or another appropriate notification that allows the receiver to deny the access request if a response is provided within a configured time window. In the event a response is not provided within the configured time window, the access request will be by default granted.

At 603, a determination is made whether an administrator has denied the access request. In the event the administrator denies the access control request, processing proceeds to 613 where access to the resource is denied. For example, when an administrator proactively denies the access request based on the received notification created at 601, access to the target resource should be immediately denied. In the event the administrator does not respond to the notification and therefore does not proactively deny the access request, processing proceeds to 605.

At 605, a determination is made whether an administrator has approved the access request. In the event the administrator proactively approves the access control request, processing proceeds to 609 where access to the resource is granted. For example, when an administrator proactively grants the access request based on the received notification created at 601, access to the target resource should be immediately allowed. In the event the administrator does not respond to the notification and therefore does not proactively allow the access request, processing proceeds to 607.

At 607, a determination is made whether the determined wait period has elapsed. In the event the determined wait period has elapsed, processing proceeds to 609 where conditional access to the resource is granted. In the event the determined wait period has not elapsed, processing loops back to 603 where a response, if provided, from the administrator can be processed.

At 609, conditional access to the targeted resource is granted. For example, the subject is granted access permissions to the targeted resource under certain conditions such as for a limited time window. In some embodiments, the approved conditional access can be permanent or temporary, as situationally appropriate. In some embodiments, the approval is logged and an audit trail is created. In some embodiments, a notification is sent to confirm that access to the targeted resource has been granted. In various embodiments, the actual grant can be implemented using a variety of methods and may be based on context. For example, conditional access may only be granted for a limited time period and/or for a limited number of queries. As another example, access may only be granted until an approved responsible party returns from an absence. In various embodiments, the granting of the access to the subject for the protected resource is based on the context of the access request and the approval. For example, the conditions of the granted access can be dependent on whether the approval was a passive approval based on an elapsed wait period or a proactive approval initiated by an administrator.

At 611, a determination is made whether the conditions allowing access to the resource have elapsed. In the event the conditions allowing access to the resource have elapsed, processing proceeds to 613 where access is revoked. In the event the conditions allowing access to the resource have not elapsed, processing loops back to 609 and the subject continues to have conditional access to the targeted resource.

At 613, access to the targeted resource is denied. For example, the subject is not granted access permissions to the targeted resource or existing access permissions are revoked. In some embodiments, the denial is logged and an audit trail is created. In some embodiments, a notification is sent to confirm that access to the targeted resource has been denied. In various embodiments, the actual denial can be implemented using a variety of methods and multiple layered responses can be utilized. For example, one or more responses can include revoking write privileges and only retaining limited read-only privileges for the user, locking the user's account for a specified time period, disabling remote access privileges for the user's account, and/or revoking access to the resource for the user and/or for a superset group of users, among other responses. In various embodiments, the actual response implemented is a situationally appropriate response and is based on the context associated with the access request.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
receiving an indication associated with a request to access a protected object by a subject;
using one or more processors to automatically analyze at least application level behavioral patterns of the subject, context of the request by the subject, usage patterns associated with the protected object, and a current system state using one or more machine learning models to determine an analysis result associated with whether to grant the subject access to the protected object, wherein the analysis result includes a plurality of predicted consequential effects of the access of the protected object determined using at least a portion of the one or more machine learning models; and
automatically modifying an access control mechanism for the protected object based on the analysis result including the plurality of predicted consequential effects determined using at least a portion of the one or more machine learning models.

2. The method of claim 1, wherein the access control mechanism for the protected object is automatically modified for a limited amount of time.

3. The method of claim 1, wherein the access control mechanism utilizes an Identity Based Access Control (IBAC) and Access Control Lists (ACLs), Role Based Access Control (RBAC), Attribute Based Access Control (ABAC), or Next Generation Access Control (NGAC).

4. The method of claim 1, further comprising:
evaluating a result of the modification to the access control mechanism; and
retraining the one or more machine learning models based on the evaluated result.

5. The method of claim 1, wherein the modified access control mechanism is a conditional modification.

6. The method of claim 5, further comprising:
identifying a failure to meet the conditional modification; and
automatically revoking the automatic modification to the access control mechanism for the protected object.

7. The method of claim 1, wherein determining the analysis result associated with whether to grant the subject access to the protected object includes:
identifying a prospective action to perform;
evaluating a confidence rating corresponding to whether an intended consequence included the plurality of predicted consequential effects will occur; and
in response to a determination that the confidence rating exceeds a threshold value, performing the prospective action.

8. The method of claim 1, wherein determining the analysis result associated with whether to grant the subject access to the protected object includes identifying a first, a second, a third, and a fourth order effect included the plurality of predicted consequential effects determined using at least a portion of the one or more machine learning models.

9. The method of claim 1, wherein determining the analysis result associated with whether to grant the subject access to the protected object includes creating a graphical representation of a current system context, wherein the current system context includes details extracted from the current system state and the context of the request by the subject.

10. The method of claim 1, wherein automatically modifying the access control mechanism for the protected object based on the analysis result includes providing a justification of the modification, wherein the justification is based on a system policy.

11. A system, comprising:
one or more processors; and
a memory coupled to the one or more processors, wherein the memory is configured to provide the one or more processors with instructions which when executed cause the one or more processors to:
receive an indication associated with a request to access a protected object by a subject;
automatically analyze at least application level behavioral patterns of the subject, context of the request by the subject, usage patterns associated with the protected object, and a current system state using one or more machine learning models to determine an analysis result associated with whether to grant the subject access to the protected object, wherein the analysis result includes a plurality of predicted consequential effects of the access of the protected object determined using at least a portion of the one or more machine learning models; and
automatically modify an access control mechanism for the protected object based on the analysis result including the plurality of predicted consequential effects determined using at least a portion of the one or more machine learning models.

12. The system of claim 11, wherein the access control mechanism for the protected object is automatically modified for a limited amount of time.

13. The system of claim 11, wherein the access control mechanism utilizes an Identity Based Access Control (IBAC) and Access Control Lists (ACLs), Role Based Access Control (RBAC), Attribute Based Access Control (ABAC), or Next Generation Access Control (NGAC).

14. The system of claim 11, wherein the memory is further configured to provide the one or more processors with instructions which when executed cause the one or more processors to:
evaluate a result of the modification to the access control mechanism; and
retrain the one or more machine learning models based on the evaluated result.

15. The system of claim 11, wherein the modified access control mechanism is a conditional modification, and wherein the memory is further configured to provide the one or more processors with instructions which when executed cause the one or more processors to:
identify a failure to meet the conditional modification; and
automatically revoke the automatic modification to the access control mechanism for the protected object.

16. The system of claim 11, wherein determining the analysis result associated with whether to grant the subject access to the protected object includes:
identifying a prospective action to perform;
evaluating a confidence rating corresponding to whether an intended consequence included the plurality of predicted consequential effects will occur; and
in response to a determination that the confidence rating exceeds a threshold value, performing the prospective action.

17. The system of claim 11, wherein determining the analysis result associated with whether to grant the subject access to the protected object includes identifying a first, a second, a third, and a fourth order effect included the plurality of predicted consequential effects determined using at least a portion of the one or more machine learning models.

18. The system of claim 11, wherein determining the analysis result associated with whether to grant the subject access to the protected object includes creating a graphical representation of a current system context, wherein the current system context includes details extracted from the current system state and the context of the request by the subject.

19. The system of claim 11, wherein automatically modifying the access control mechanism for the protected object based on the analysis result includes providing a justification of the modification, wherein the justification is based on a system policy.

20. A non-transitory computer readable storage medium comprising computer instructions for:
- receiving an indication associated with a request to access a protected object by a subject;
- automatically analyzing at least application level behavioral patterns of the subject, context of the request by the subject, usage patterns associated with the protected object, and a current system state using one or more machine learning models to determine an analysis result associated with whether to grant the subject access to the protected object, wherein the analysis result includes a plurality of predicted consequential effects of the access of the protected object determined using at least a portion of the one or more machine learning models; and
- automatically modifying an access control mechanism for the protected object based on the analysis result including the plurality of predicted consequential effects determined using at least a portion of the one or more machine learning models.

\* \* \* \* \*